United States Patent Office 2,767,114
Patented Oct. 16, 1956

2,767,114

SEED DISINFECTANTS CONTAINING ARSENATE SALTS OF MONOTHIO ACIDS

Ewald Urbschat, Koln-Mulheim, and Paul-Ernst Frohberger, Odenthal, Germany, assignors to Farbenfabriken Bayer Aktiengesellschaft, Leverkusen, Germany, a corporation of Germany No Drawing. Application September 29, 1954,
Serial No. 459,203

Claims priority, application Germany October 5, 1953

9 Claims. (Cl. 167—21)

The present invention relates to useful improvements in seed grain disinfectants; more particularly it is concerned with arsenic compounds which are useful for rendering seed grain immune against attacks by fungi.

A variety of seed disinfectants are known for the control of seed-borne diseases. Formerly, seed grains were protected against such diseases by treatment with inorganic mercury and copper salts as well as formaldehyde. The discovery that organic compounds containing mercury insure an increased and universal efficacy in the protection of seeds from soil-borne fungi and bacteria constituted a considerable advance in agriculture. The application of these organic mercury compounds of the most varied composition, however, is associated with the disadvantage that their mercury content provides a poisonous effect over long periods. Therefore, research works have been carried out for the purpose of replacing these organic mercury compounds by preparations having no chronical toxicity.

The principal object of the present invention is to provide effective and universal seed grain disinfectants.

Another object is to provide seed grain disinfectants containing no mercury, which do not lead to toxic damages over long periods.

Further objects will become apparent as the following description proceeds.

In accordance with the present invention it has been found that arsenic compounds of the formulae $$\begin{matrix} \text{I} & & \text{II} \\ \phantom{xx}\text{SCOR} & & \text{R}' \\ R'{-}As \phantom{xxx} & & \phantom{xxx} As{-}SCOR \\ \phantom{xx}\text{SCOR} & & \text{R}' \end{matrix}$$

show fungicidal activity and can be used as highly potent seed grain disinfectants. They are universal dressing agents against all diseases which are controllable with disinfectants.

In these formulae R and R' stand for any aliphatic or aromatic radical. Suitable aliphatic radicals are for instance alkyl radicals such as methyl-, ethyl-, propyl- and butyl radicals, which may be substituted for instance by halogen or other groups. Suitable aromatic radicals are, for instance, phenyl- and naphthyl radicals which may be substituted by halogen, alkyl or alkoxy groups. The aromatic radicals which are useful according to the invention also include compounds wherein one hydrocarbon atom is replaced by a hetero atom, for instance pyridine, quinoline or substitution products thereof. In the formula II

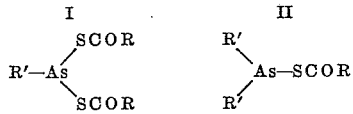

may stand for a heterocyclic compound. Examples of such heterocyclic compounds are diphenylarsine, phenoxarsine, phenarsazine and the nuclear substitution products thereof, for instance with alkyl, halogen, nitro, hydroxy or alkoxy groups.

The aforesaid compounds can be obtained from arsenic oxides and the free monothiocarboxylic acids or the primary or secondary arsenic chlorides and the salts of monothiocarboxylic acids according to the following equation:

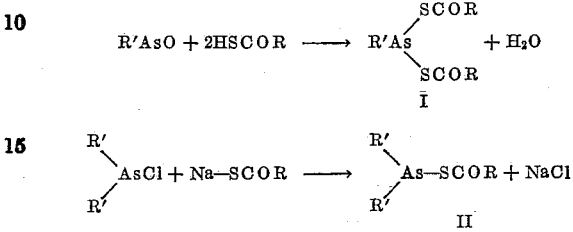

In the most simple method of producing the above-said arsenic compounds the solution or suspension of an arsenic oxide is added to the aqueous solutions of the alkali metal salts of monothiocarboxylic acids, which are easily obtainable by conventional methods, and the monothiocarboxylic acid recovered by addition of an acid. The reaction proceeds at high velocity and almost quantitatively. The isolating of the resulting products is easy to perform.

The products can be applied as disinfectants in pure form or in solution or suspension, or in dilution with customary inert materials. The most various solvents are suitable for the application of the new disinfectants in solution. As solvents there may be used for instance water, alcohols, hydrocarbons, chloroform, tetrachloromethane and acetone. Examples of suitable inert materials are talcum, chalk, bentonite and pulverized rock. As compared with the previously known fungicides containing organic arsenic compounds, the new compounds are distinguished by their absence of odors, failure to cause irritation and increased efficacy, especially in the control of loose smut of oats (Ustilago avenae). In the latter case they are superior to disinfectants containing mercury and reach the fungicidal activity of formaldehyde without having the disadvantages of formaldehyde. The arsenic compounds according to the invention can be applied in admixture with other fungicides, insecticides, trace elements or other substances favorably affecting their properties.

Examples of such other fungicides and insecticides are disinfectants containing metal, insecticidal and fungicidal phosphoric acid esters, insecticidal and fungicidal chlorinated hydrocarbons, for instance hexachlorocyclohexane, dichloro - diphenyl - trichloro ethane, hexachlorobenzene, chlorinated quinone diene addition products. As trace elements which may be used as additives to the new disinfectants there may be named copper, manganese, cobalt and molybdenum.

In the following some methods of preparing some of the new disinfectants are given by way of example.

PREPARATION 1

Methyl arsenic-bis-monothiobenzoate

A solution of 10.6 grams of methyl arsenic oxide in 100 ccm. of $H_2O$ is added to a solution of 36 grams of the potassium salt of monothiobenzoic acid in 200 ccm. of water. The mixture, which becomes turbid, is acidified with dilute acetic acid with the addition of ice and stirring. The reaction product precipitates as a resin which solidifies after some time. After filtering with suction, washing and drying, 33 grams of a substance are obtained, which yields reddish crystals of the M. P. 62° C. after recrystallizing from gasoline.

PREPARATION 2

*Methyl arsenic-bis-p-chloromonothiobenzoate*

If the potassium salt employed in Example 1 is replaced by 40 grams of the potassium salt of p-chloromonothiobenzoic acid and the reaction is carried out under otherwise equal conditions. 40.2 grams of a colorless product are obtained, which yields colorless crystals of the M. P. 122° C. after recrystallizing from alcohol.

PREPARATION 3

*Methyl arsenic-bis-pentachloromonothiobenzoate*

70 grams of the potassium salt of pentachloromonothiobenzoic acid (obtainable from pentachlorobenzoyl chloride and potassium sulfhydrate) are reacted in 300 ccm. of $H_2O$ with 10.6 grams of methyl arsenic oxide in 100 ccm. of $H_2O$. By acidifying the mixture the reaction product is obtained as a colorless precipitate. The product is obtained in an amount of 61 grams and yields colorless crystals of the M. P. 161–162° C. after recrystallizing from gasoline.

PREPARATION 4

*Phenarsazine-monothiobenzoate*

10 grams of the potassium salt of thiobenzoic acid are mixed with a solution of 14 grams of phenarsazine chloride in 100 ccm. of hot acetone and the mixture is boiled with stirring for 2 hours. After evaporating the major quantity of the solvent, water is added. An oil precipitates and crystallizes soon. After drying 18.3 grams of the reaction product are obtained. By dissolving in little boiling acetone, adding an equal volume of hot methanol and cooling, light-brown crystals of the M. P. 169° are obtained.

PREPARATION 5

*Methyl arsenic-bis-monothioacetate*

15.2 grams of monothioacetic acid in 100 ccm. of benzene are mixed with 10.6 grams of methyl arsenic oxide in 100 ccm. of benzene. In the exothermic reaction occurring the mixture becomes turbid by formation of water. After one hour the mixture is dried with calcium chloride and the solvent evaporated. The remaining oil is separated from some methyl arsenic sulfide; it weighs 22 grams. The product is purified by distillation in vacuo. Boiling point: 148–150° C. under 14 mm. pressure.

PREPARATION 6

*Phenyl arsenic-bis-monothiobenzoate*

40 grams of the potassium salt of monothiobenzoic acid in 500 ccm. of water are added to a solution of 33.6 grams of phenyl arsenic oxide in 1000 ccm. of $H_2O$ and 12 grams of sodium hydroxide. The mixture is acidified with the addition of ice and stirring, the resulting colorless precipitate filtered with suction after 30 minutes, washed with water and recrystallized from acetone. Colorless crystals of the melting point 131–132° C. are obtained.

PREPARATION 7

*Diphenyl arsenic monothio-p-chlorobenzoate*

14.2 grams of diphenyl arsenic chloride are boiled for some time in 130 cc. of tetrahydrofuran with 12 grams of the potassium salt of p-chloromonothiobenzoic acid. After separating off the potassium chloride the solvent is evaporated and the oily residue recrystallized from boiling methanol. Upon slowly cooling colorless crystals of the melting point 87–88° C. are obtained.

EXAMPLES

The fungicidal activity of a selection of the new seed disinfectants is shown in the tables below. The disinfectants were applied in field and greenhouse experiments as well as in dishes according to the Gassner method. They were admixed with talcum and applied as dry disinfectants in the usual manner. The arsenic content of the mixture of the disinfectants and talcum varied within a range of between —.75% and 5.00%.

The figures in column 3 of the tables below refer to the quantity of the mixture in gram per 1 kg. of seed.

TABLE I

[Loose smut of oats (*Ustilago avenae*) under extremely favorable conditions of attack (field experiment).]

| 1 preparation | 2 concentration | 3 quantity | 4 number of attacked panicles, percent |
|---|---|---|---|
| non-treated | | | 139.8 |
| Methoxyethyl-Hg-silicate | 1.5% Hg | 3 | 30.0 |
| $CH_3-As\begin{matrix}S-CO-C_6H_5\\S-CO-C_6H_5\end{matrix}$ | 5.0% As | 3 | 4.0 |
| $CH_3-As\begin{matrix}S-CO-C_6H_4-p-Cl\\S-CO-C_6H_4-p-Cl\end{matrix}$ | 5.0% As | 3 | 4.4 |
| formaldehyde | 40% | (¹) | 5.5 |

¹ 0.25% immersed for 15 minutes.

TABLE II

[Leaf stripe of barley (*Helminthosporium gramineum*) (field experiment).

| 1 preparation | 2 concentration | 3 quantity | 4 number of attacked panicles, percent |
|---|---|---|---|
| non-treated | | | 18.3 |
| $C_2H_5HgCl$ | 1.5% Hg | 1.5 | 0.0 |
| $CH_3-As\begin{matrix}S-CO-C_6H_5\\S-CO-C_6H_5\end{matrix}$ | 5.0% As | 0.5 / 1.5 / 2 | 0.2 / 0.0 / 0.0 |
| $CH_3-As\begin{matrix}S-CO-C_6H_4-p-Cl\\S-CO-C_6H_4-p-Cl\end{matrix}$ | 5.0% As | 0.5 / 1.5 / 2 | 0.0 / 0.2 / 0.0 |

TABLE III

[Stinking smut of wheat (*Tilletia tritici*) (field experiments).]

| 1 preparation | 2 concentration | 3 quantity | 4 attack in percent |
|---|---|---|---|
| non-treated | | | 13.2 |
| Phenyl-Hg-acetate | 1% Hg | 1.5 / 2 | 1.00 / 0.79 |
| Phenyl-Hg-acetate | 1.75% Hg | 1.5 / 2 | 0.22 / 0.11 |
| $CH_3-As\begin{matrix}S-CO-C_6H_5\\S-CO-C_6H_5\end{matrix}$ | 2.5% As | 0.5 / 1.5 / 2 | 0.09 / 0.00 / 0.00 |
| $CH_3-As\begin{matrix}S-CO-C_6H_4-p-Cl\\S-CO-C_6H_4-p-Cl\end{matrix}$ | 2.5% As | 0.5 / 1.5 / 2 / 4 | 0.04 / 0.00 / 0.02 / 0.00 |
| $CH_3As\begin{matrix}S-COCH_3\\S-COCH_3\end{matrix}$ | 2.5% As | 0.5 / 1.5 / 2 / 4 | 0.15 / 0.04 / 0.04 / 0.00 |

TABLE IV

[Leaf stripe of barley (*Helminthosporium gramineum*) (field experiments).]

| 1<br>preparation | 2<br>concentration | 3<br>quantity | 4<br>attack in percent |
|---|---|---|---|
| non-treated | | | 15.36 |
| Phenyl-Hg-acetate | 1% Hg | 1.5<br>2 | 0.35<br>0.13 |
| Phenyl-Hg-acetate | 1.75% Hg | 1.5<br>2 | 0.26<br>0.22 |
| CH₃—As(S—CO—C₆H₅)₂ | 2.5% As | 0.5<br>1.5<br>2<br>4 | 0.13<br>0.04<br>0.00<br>0.00 |
| CH₃—As(S—CO—C₆H₄—p—Cl)₂ | 2.5% As | 0.5<br>1.5<br>2<br>4 | 0.09<br>0.00<br>0.00<br>0.00 |
| CH₃—As(S—COCH₃)₂ | 2.5% As | 0.5<br>1.5<br>2<br>4 | 0.04<br>0.00<br>0.00<br>0.00 |

TABLE VI

[Fusarium disease (*Fusarium nivale*) (field experiments under extremely favorable conditions of attack).]

| 1<br>preparation | 2<br>concentration | 3<br>quantity | 4<br>attack in percent |
|---|---|---|---|
| non-treated | | | 94 |
| Methoxyethyl-Hg-silicate | 1.75% Hg | 2 | 61 |
| CH₃—As(S—CO—C₆H₅)₂ | 2.5% As<br>5.0% As | 2<br>2 | 26<br>9 |
| CH₃—As(S—CO—C₆H₄—p—Cl)₂ | 2.5% As<br>5.0% As | 2<br>2 | 19<br>12 |
| CH₃As(S—COCH₃)₂ | 2.5% As | 2 | 41 |

TABLE V

[Loose smut of oats (*Ustilago avenae*) (field experiments using naturally and artificially infected seed)]

| 1<br>preparation | 2<br>concentration | 3<br>quantity | 4 attack in percent | |
|---|---|---|---|---|
| | | | naturally infected | artificially infected |
| non-treated | | | 0.72 | 9.9 |
| ethyl-Hg-p-toluenesulfon-anilide | 1% Hg | 2.5<br>3 | 0.19<br>0.10 | 5.2<br>5.5 |
| ethyl-Hg-p-toluenesulfon-anilide | 1.75% Hg | 2.5<br>3 | 0.17<br>0.25 | 8.0<br>5.6 |
| CH₃—As(S—CO—C₆H₅)₂ | 2.5% As | 0.75<br>2.5<br>3 | 0.14<br>0.02<br>0.00 | 1.6<br>2.3<br>1.7 |
| CH₃—As(S—CO—C₆H₄—p—Cl)₂ | 2.5% As | 0.75<br>2.5<br>3 | 0.00<br>0.00<br>0.00 | 2.6<br>2.5<br>2.6 |
| CH₃As(S—COCH₃)₂ | 2.5% As | 0.75<br>2.5<br>3 | 0.12<br>0.00<br>0.02 | 1.9<br>2.7<br>1.7 |
| CH₃As(S—CO)₂ (cyclic) | 2.5% As | 2.5<br>3 | 0.02<br>0.00 | 1.6<br>2.0 |

TABLE VII

[Stinking smut of wheat (*Tilletia tritici*) (Gassner method).]

| 1 preparation | 2 concentration | 3 quantity | 4 germination |
|---|---|---|---|
| non-treated | | | 100%. |
| CH₃As(S—CO—C₆Cl₅)(S—CO—C₆Cl₅) | 2.5% As 5.0% As | 1 1 | a few germs. none. |
| CH₃As(S—CO—OC₂H₅)(S—CO—OC₂H₅) | 2.5% As 5.0% As | 1 1 | a few germs. none. |
| phenoxazine-As(S—CO—C₆H₅) with NH | 2.5% As 5.0% As | 1 1 | a few germs. none. |
| C₆H₅—As(S—CO—C₆H₅)(S—CO—C₆H₅) | 1.0% As 2.5% As 5.0% As | 1 1 1 | sporadic germs. none. none. |
| xanthene-As(S—CO—C₆H₅) | 2.5% As 5.0% As | 1 1 | a few germs. none. |

TABLE VIII

[Leaf stripe of barley (*Helminthosporium gramineum*) (greenhouse experiments using naturally infected seed).]

| 1 preparation | 2 concentration | 3 quantity | 4 attack in percent |
|---|---|---|---|
| non-treated | | | 14 |
| CH₃As(S—CO—C₆Cl₅)(S—CO—C₆Cl₅) | 0.75% As 1.25% As 2.5% As | 2 2 2 | 0.3 0.0 0.0 |
| CH₃As(S—CO—OC₂H₅)(S—CO—OC₂H₅) | 1.25% As 2.5% As 5.0% As | 2 2 2 | 1.7 0.0 0.0 |
| C₆H₅—As(S—CO—C₆H₅)(S—CO—C₆H₅) | 0.75% As 1.25% As 2.4% As | 2 2 2 | 1 0.0 0.0 |
| xanthene-As(S—CO—C₆H₅) | 2.5% As 5.0% As | 2 2 | 0.0 0.0 |

TABLE IX

[Loose smut of oats (*Ustilago avenae*) (greenhouse experiments using naturally infected seed).]

| 1 preparation | 2 concentration | 3 quantity | 4 attack in percent |
|---|---|---|---|
| non-treated | | | 5 |
| CH₃As(S—CO—C₆Cl₅)(S—CO—C₆Cl₅) | 2.5% As 5.0% As | 3 3 | 2 0.0 |
| CH₃As(S—CO)(S—CO) cyclic | 2.5% As 5.0% As | 3 3 | 0.5 0.0 |

TABLE X

[Fusarium disease (*Fusarium nivale*) (greenhouse experiments using naturally infected seed).]

| 1 preparation | 2 concentration | 3 quantity | 4 attack in percent |
|---|---|---|---|
| non-treated | | | 7 |
| CH₃As(S—CO—C₆Cl₅)(S—CO—C₆Cl₅) | 5.0% As | 2 | 0.0 |
| phenoxazine-As(S—CO—C₆H₅) with NH | 5.0% As | 2 | 1 |
| C₆H₅—As(S—CO—C₆H₅)(S—CO—C₆H₅) | 2.5% As 5.0% As | 2 2 | 1. 0.5 |

It is to be understood that the invention is by no means restricted to the compounds specifically set forth in the description and examples but that also compounds containing other substituents, which are within the scope of the invention, are highly effective and universal seed grain disinfectants, which enable farmers to avoid all losses formerly due to diseases carried by the seeds of cereals, cotton, vegetables and other crops, and result in increased germination, saving of seeds and higher yields. Furthermore, carriers and diluents other than those specifically mentioned above may be employed for the application of the new seed grain disinfectants. Also seed-borne diseases other than those referred to in the examples can successfully be controlled with the new disinfectants. Examples of important diseases controllable with the arsenic compounds to be used as dressing agents according to the invention are stinking smut of wheat (*Tilletia tritici*), loose smut of oats (*Ustilago avenae*), leaf stripe of barley (*Helminthosporium gramineum*), fusarium diseases (*Fusarium nivale, Fusarium lini*), black leg of beets (*Phoma betae*), Seedling blight of flax (*Colletotricium lini*), covered smut of barley (*Ustilago hordei*).

We claim:

1. Seed grain disinfectants, containing as an active ingredient a member selected from the group consisting of

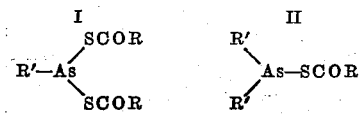

wherein R' means a member selected from the group consisting of lower alkyl and phenyl, and R means a member selected from the group consisting of lower alkyl, phenyl and chlorophenyl.

2. Seed grain disinfectants, containing as an active ingredient a compound of the formula

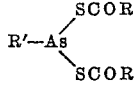

wherein R' means a member selected from the group consisting of lower alkyl and phenyl, and R means a member selected from the group consisting of lower alkyl, phenyl and chlorophenyl.

3. Seed grain disinfectants, containing as an active ingredient a compound of the formula

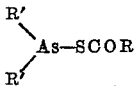

wherein R' means a member selected from the group consisting of lower alkyl and phenyl, and R means a member selected from the group consisting of lower alkyl, phenyl and chlorophenyl.

4. Seed grain disinfectants as claimed in claim 3, wherein

means a member selected from the group consisting of diphenylarsine, phenoxarsine and phenarsazine.

5. A seed grain disinfectant, containing a compound of the formula

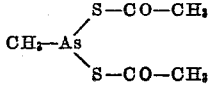

6. A seed grain disinfectant containing a compound of the formula

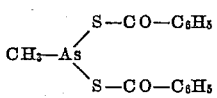

7. A seed grain disinfectant containing a compound of the formula

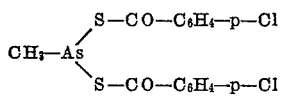

8. A seed grain disinfectant containing a compound of the formula

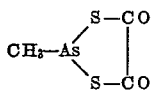

9. A seed grain disinfectant containing a compound of the formula

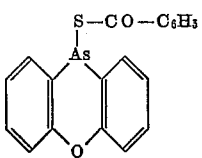

References Cited in the file of this patent
UNITED STATES PATENTS

| | | |
|---|---|---|
| 1,677,392 | Kharasch | July 17, 1928 |
| 1,909,498 | Oechslin | May 16, 1933 |
| 2,566,382 | Sweet et al. | Sept. 4, 1951 |
| 2,644,005 | Urbschat | June 30, 1953 |